United States Patent
Ulrich et al.

(10) Patent No.: US 9,662,746 B2
(45) Date of Patent: *May 30, 2017

(54) LINKAGE ASSEMBLY FOR IMPLEMENT SYSTEM OF MACHINE

(71) Applicant: Caterpillar Inc., Peoria, IL (US)

(72) Inventors: William J. Ulrich, East Peoria, IL (US); Naesung Lyu, Champaign, IL (US); Balasubramanyam Appalla, Dunlap, IL (US); Tilak Inturi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 233 days.

This patent is subject to a terminal disclaimer.

(21) Appl. No.: 14/444,567

(22) Filed: Jul. 28, 2014

(65) Prior Publication Data

US 2016/0024753 A1    Jan. 28, 2016

(51) Int. Cl.
| | |
|---|---|
| *E02F 9/14* | (2006.01) |
| *B23K 31/02* | (2006.01) |
| *E02F 3/38* | (2006.01) |
| *B23K 101/00* | (2006.01) |
| *B23K 101/24* | (2006.01) |
| *B23K 101/28* | (2006.01) |

(52) U.S. Cl.
CPC ............ *B23K 31/02* (2013.01); *E02F 3/38* (2013.01); *E02F 3/384* (2013.01); *B23K 2201/006* (2013.01); *B23K 2201/24* (2013.01); *B23K 2201/28* (2013.01)

(58) Field of Classification Search
CPC ...................................... E02F 3/32; E02F 3/38
See application file for complete search history.

(56) References Cited

U.S. PATENT DOCUMENTS

| | | |
|---|---|---|
| 3,722,864 A | 3/1973 | Borer et al. |
| 4,029,225 A | 6/1977 | Wirt |
| 4,034,876 A | 7/1977 | Yancey |
| 4,042,131 A | 8/1977 | Buttke |
| 4,069,637 A | 1/1978 | Braithwaite |
| 4,159,796 A | 7/1979 | Braithwaite |

(Continued)

FOREIGN PATENT DOCUMENTS

| | | |
|---|---|---|
| CN | 202492869 U | 10/2012 |
| CN | 103255803 A | 8/2013 |

(Continued)

*Primary Examiner* — Scott Lowe
(74) *Attorney, Agent, or Firm* — Leydig, Voit & Mayer, Ltd.

(57) ABSTRACT

A load-bearing member for a linkage assembly of an implement system includes a body and a joint assembly. The body includes a pair of sidewalls, a top portion, and a bottom portion. The top and bottom portions extend between the sidewalls and are connected to an inner surface of each of the sidewalls. The body is substantially free of structural weldments disposed within an interior cavity of the body. The joint assembly includes a cylindrical tube and a reinforcement plate. The cylindrical tube extends between and is connected to the sidewalls. The reinforcement plate is connected to an outer surface of one of the sidewalls. The reinforcement plate includes a central portion defining a tube opening and is in circumscribing relationship with the cylindrical tube such that it is disposed within the tube opening.

17 Claims, 11 Drawing Sheets

(56) References Cited

U.S. PATENT DOCUMENTS

| | | | |
|---|---|---|---|
| 4,428,173 A | 1/1984 | Knell | |
| 4,636,132 A | 1/1987 | Menke et al. | |
| 5,984,618 A | 11/1999 | Deneve et al. | |
| 5,993,139 A | 11/1999 | Deneve et al. | |
| 6,158,949 A | 12/2000 | Walth et al. | |
| 6,293,033 B1 | 9/2001 | Moriya et al. | |
| 6,604,305 B2 | 8/2003 | Koch | |
| 6,616,398 B2 | 9/2003 | Dershem et al. | |
| 6,793,452 B2 | 9/2004 | Cusack et al. | |
| 7,059,126 B2 | 6/2006 | Ma | |
| 7,165,929 B2 | 1/2007 | Janes et al. | |
| 7,293,377 B2 | 11/2007 | Pinther, II et al. | |
| 7,908,928 B2 | 3/2011 | Vik et al. | |
| 8,083,461 B2 | 12/2011 | Smith et al. | |
| 8,505,258 B2* | 8/2013 | Durney | B21D 5/00 493/352 |
| 9,376,783 B2* | 6/2016 | Ulrich | E02F 3/32 |
| 2006/0251503 A1 | 11/2006 | Janes et al. | |
| 2006/0269386 A1 | 11/2006 | Layko et al. | |
| 2007/0104566 A1 | 5/2007 | Layko et al. | |
| 2009/0183398 A1 | 7/2009 | McClallen et al. | |
| 2010/0061808 A1 | 3/2010 | Smith et al. | |
| 2010/0089888 A1 | 4/2010 | Forck et al. | |
| 2012/0163950 A1 | 6/2012 | Seljestad | |
| 2012/0301257 A1 | 11/2012 | Seljestad | |
| 2012/0328400 A1 | 12/2012 | Seljestad | |
| 2013/0058748 A1 | 3/2013 | Springer et al. | |
| 2013/0078072 A1 | 3/2013 | Yelistratov et al. | |
| 2013/0129461 A1 | 5/2013 | Seljestad | |
| 2013/0153064 A1 | 6/2013 | McKimpson et al. | |
| 2013/0259627 A1 | 10/2013 | Seljestad | |
| 2013/0285332 A1 | 10/2013 | Bishop | |
| 2013/0330161 A1 | 12/2013 | Rich | |
| 2014/0007467 A1 | 1/2014 | Kovar et al. | |
| 2014/0079521 A1 | 3/2014 | Lau et al. | |
| 2014/0079523 A1 | 3/2014 | Jensen et al. | |
| 2014/0101976 A1 | 4/2014 | Shea et al. | |
| 2014/0102243 A1 | 4/2014 | Shea et al. | |
| 2016/0024753 A1* | 1/2016 | Ulrich | E02F 9/14 414/727 |

FOREIGN PATENT DOCUMENTS

| | | |
|---|---|---|
| JP | 2007-016543 A | 1/2007 |
| KR | 2012-0072741 A | 7/2012 |
| RU | 2070953 C1 | 12/1996 |
| WO | WO 2013-121969 A1 | 8/2013 |

* cited by examiner

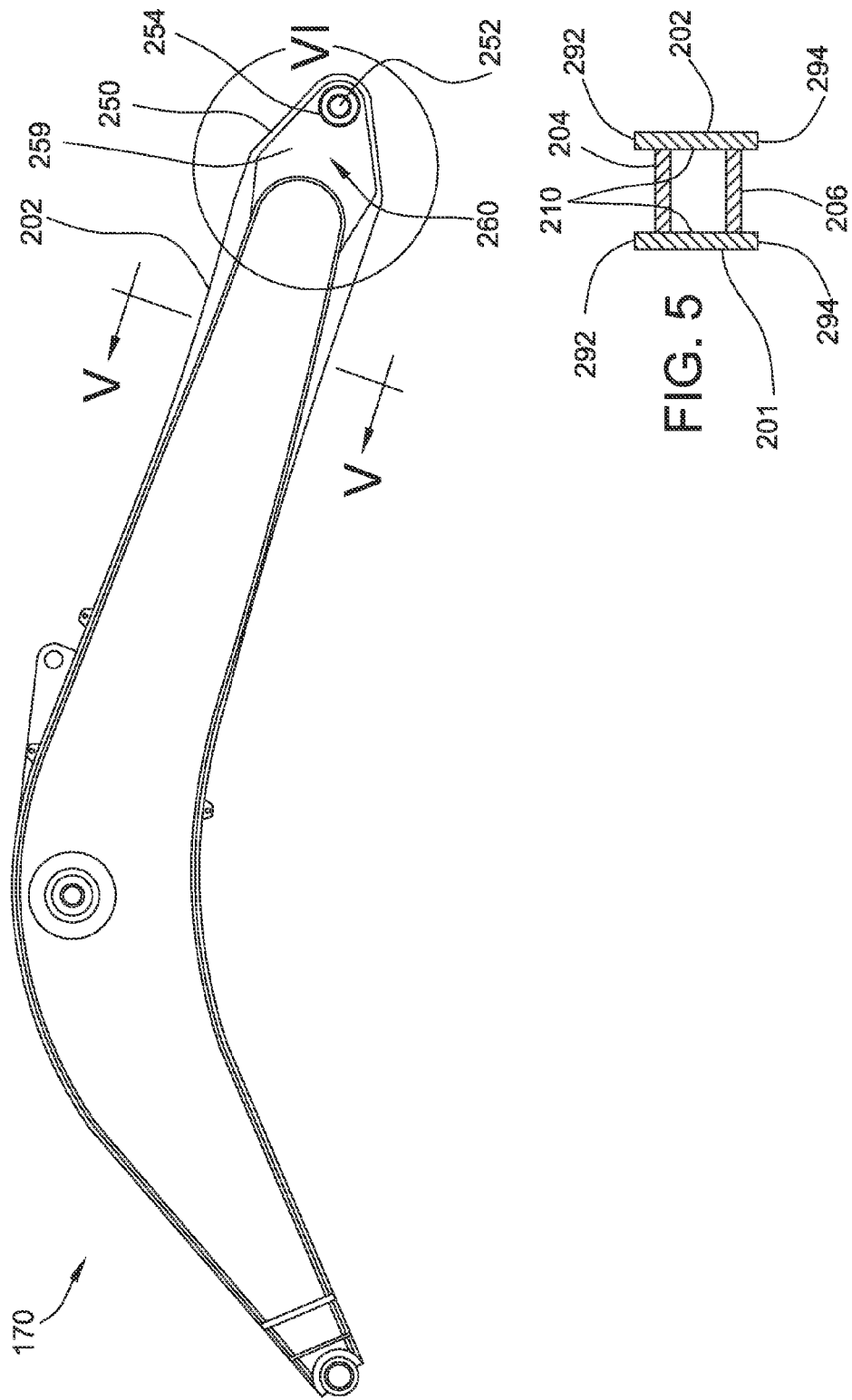

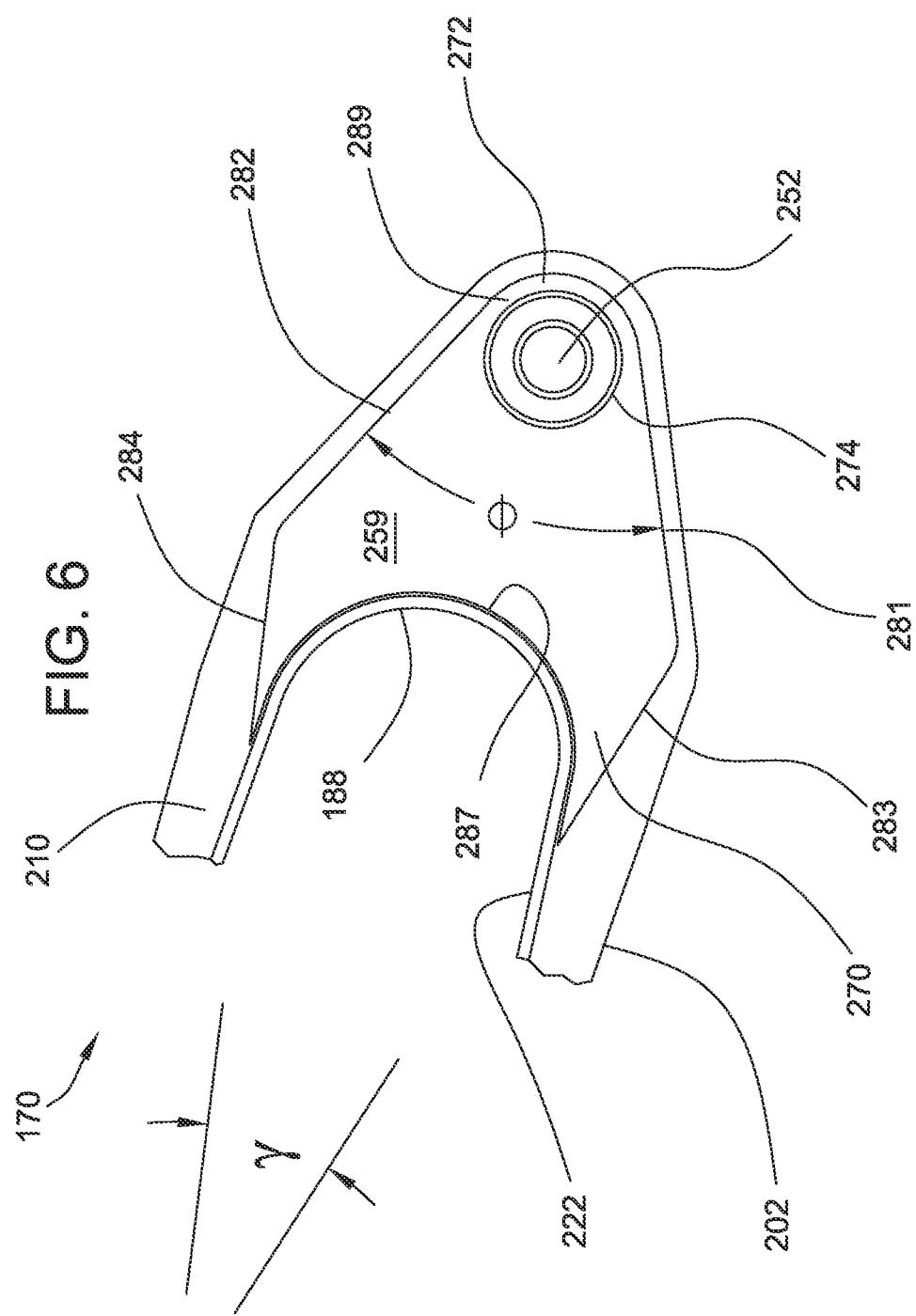

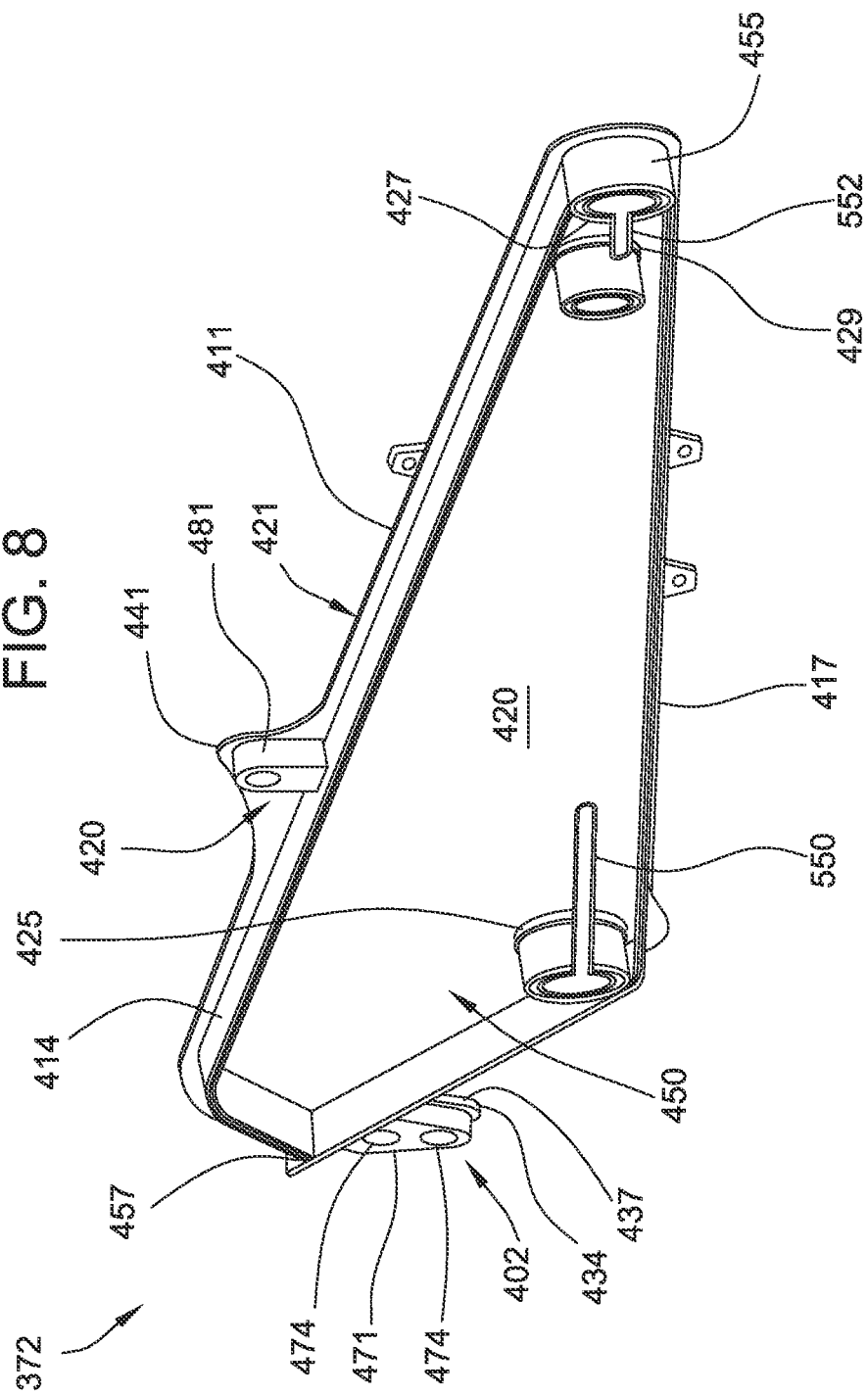

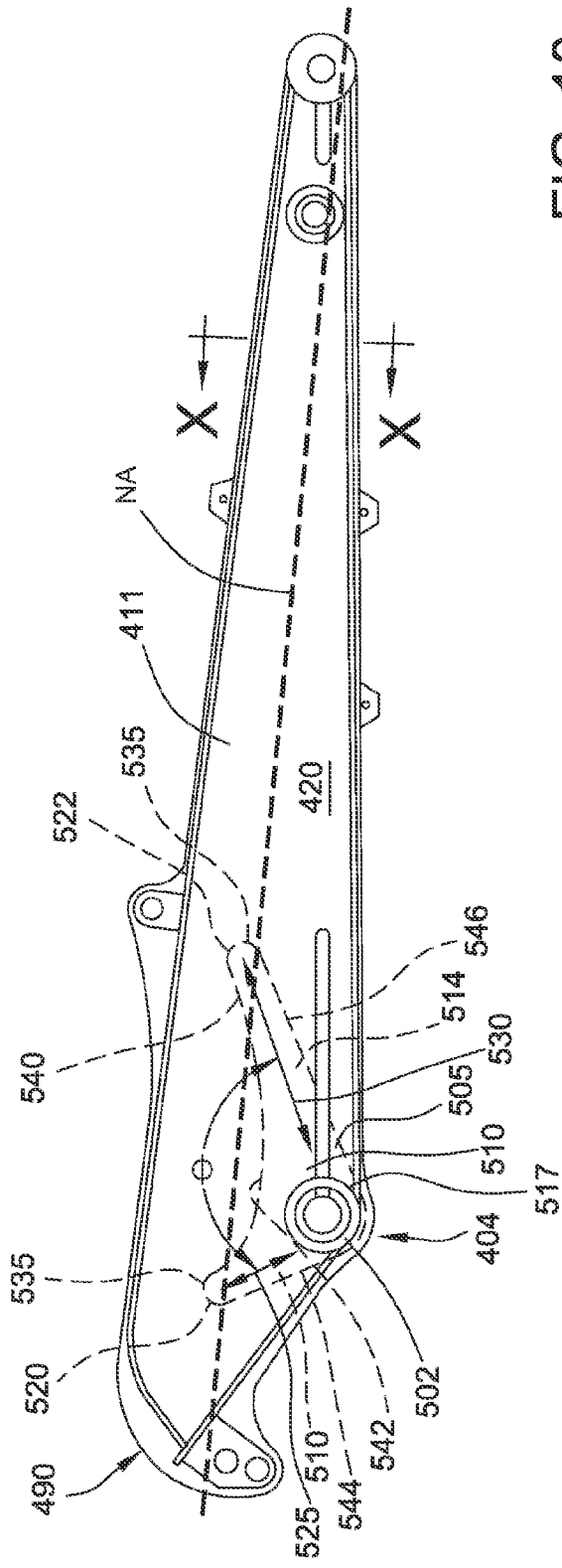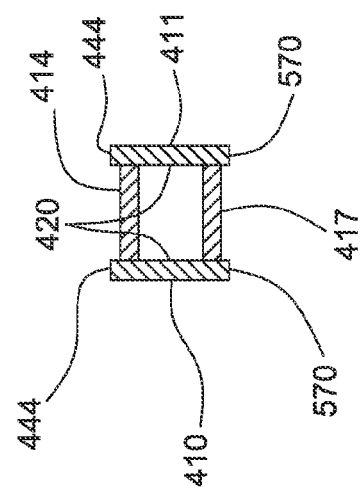

Fabricate a stick body such that the interior cavity of the stick body is substantially free of structural weldments
910

Fabricate the stick joint assembly such that the stick joint assembly is fabricated without using a forging operation
920

Connect a stick joint assembly to the stick body so that (1) a cylindrical tube is disposed within stick pivot openings of sidewalls of the stick body and (2) a stick joint reinforcement plate is connected to one of the sidewalls so that ends of first and second arms of the reinforcement plate are disposed along a neutral axis of the stick body.
930

LINKAGE ASSEMBLY FOR IMPLEMENT SYSTEM OF MACHINE

TECHNICAL FIELD

This patent disclosure relates generally to an implement-carrying linkage assembly for a machine and, more particularly, to a linkage assembly including a boom and a stick for use in a machine, such as, an excavator.

BACKGROUND

Implement-carrying linkages for excavators and other similar machines can include multiple load bearing structures, such as components commonly referred to as a "boom" and a "stick," which are fabricated from a number of steel plates joined together by welds to form a box beam (also referred to as a box section). The box beam includes a hollow region enclosed by the steel plates. The box beam structure can be subjected to significant torsional loads during use of the machine, which can deform the box beam structure and lead to failure of the component.

One solution to provide enhanced rigidity to a box beam structure subject to torsional loads is to weld baffle plates within the box beam at various locations. However, manufacturing a box beam structure having such internally-welded baffle plates requires a significant amount of tooling, welding equipment, and process time. Additionally, because the baffle plates are internal to the structure, visual inspection of the baffle plate welds requires cutting into the box beam to access the baffle plates and their associated welds, and, if warranted, repairing the box beam through the access hole.

Typical booms in the industry have a similar arrangement at the boom "nose" the portion of the boom providing a junction between the stick and the boom. Typically, two lateral members extend from the main boom body and around the stick, like a fork. Under load however, these lateral members tend to have large stress concentrations at their junction with the main body of the boom. To reduce this stress, a third member spanning between the lateral members is usually provided as an internal baffle, with internal welds that can fail without warning as they cannot be routinely inspected for early cracks. The entire nose can be a casting with the third member an integral part of the casting, but this approach can be expensive.

U.S. Patent Application Publication No. US 2013/0058748 is entitled, "Apparatus and Method for Reinforcement of a Load Bearing Structure," and is directed to a reinforcement device for a load bearing structure. The reinforcement device may include a tubular wall including a first end, a second end, a throat disposed between the first end and the second end, and a curved portion disposed between the throat and each of the first end and the second end. The tubular wall may also include a first dimension at the throat and a second dimension at each of the first and second ends, the first dimension being smaller than the second dimension. The reinforcement device can be used as a transverse member of a component (e.g., a boom) in a linkage assembly for an excavator.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a load-bearing member for a linkage assembly of an implement system. The load-bearing member includes a body and a joint assembly.

The body includes a pair of sidewalls, a top portion, and a bottom portion. The pair of sidewalls is in lateral spaced relationship to each other. The pair of sidewalls each includes an inner surface in confronting relationship with each other and an outer surface in respective opposing relationship to the inner surface. The top portion extends between the pair of sidewalls and is connected to the inner surface of each of the pair of sidewalls. The bottom portion extends between the pair of sidewalls and is connected to the inner surface of each of the pair of sidewalls. The pair of sidewalls, the top portion, and the bottom portion define an interior cavity. Each of the pair of sidewalls defines therein a pivot opening. The body is substantially free of structural weldments disposed within the interior cavity of the body.

The joint assembly includes a cylindrical tube and a reinforcement plate. The cylindrical tube extends between and is connected to the pair of sidewalls. The cylindrical tube is disposed within the pivot opening of both of the pair of sidewalls. The reinforcement plate is connected to the outer surface of one of the pair of sidewalls. The reinforcement plate includes a central portion defining a tube opening. The central portion is in circumscribing relationship with the cylindrical tube such that the cylindrical tube is disposed within the tube opening.

In another embodiment, a machine is provided. The machine includes a frame and an implement system pivotally connected to the frame.

The frame includes a power system configured to supply power to the machine and an operator station configured to selectively operate the machine. The implement system is in operable arrangement with the power system and the operator station such that the implement system is selectively movable by the operator station from power supplied by the power system. The implement system includes a boom pivotally coupled to the frame, a stick pivotally coupled to the boom, and an implement pivotally coupled to the stick. At least one of the boom and the stick includes a body and a joint assembly.

The body includes a pair of sidewalls, a top portion, and a bottom portion. The pair of sidewalls is in lateral spaced relationship to each other. The pair of sidewalls each include an inner surface in confronting relationship with each other and an outer surface in respective opposing relationship to the inner surface. The top portion and the bottom portion extend between the pair of sidewalls and are connected to the inner surface of each of the pair of sidewalls. The pair of sidewalls, the top portion, and the bottom portion define an interior cavity. Each of the pair of sidewalls defines therein a pivot opening. The body is substantially free of structural weldments disposed within the interior cavity of the body.

The joint assembly includes a cylindrical tube and a reinforcement plate. The cylindrical tube extends between and is connected to the pair of sidewalls. The cylindrical tube is disposed within the pivot opening of both of the pair of sidewalls. The reinforcement plate is connected to the outer surface of one of the pair of sidewalls. The reinforcement plate includes a central portion defining a tube opening. The central portion is in circumscribing relationship with the cylindrical tube such that the cylindrical tube is disposed within the tube opening.

In still another embodiment, a method of making a load-bearing member for a linkage assembly of an implement system is disclosed. The method includes fabricating a body and connecting a joint assembly to the body.

The body includes a pair of sidewalls, a top portion, and a bottom portion. The pair of sidewalls each includes an inner surface and an outer surface in respective opposing relationship to the inner surface. The body is fabricated such that: the pair of sidewalls are in lateral spaced relationship to each other, each inner surface of the pair of sidewalls is in confronting relationship with the other inner surface, the top portion extends between the pair of sidewalls and is connected to the inner surface of each of the pair of sidewalls, the bottom portion extends between the pair of sidewalls and is connected to the inner surface of each of the pair of sidewalls, the pair of sidewalls, the top portion, the bottom portion define an interior cavity, and each of the pair of sidewalls define therein a pivot opening. The body is fabricated and the joint assembly is connected to the body by welding such that the body is substantially free of structural weldments disposed within the interior cavity of the body.

The joint assembly includes a cylindrical tube and a reinforcement plate. The reinforcement plate includes a central portion defining a tube opening. The joint assembly is connected to the body such that: the cylindrical tube extends between and is connected to the pair of sidewalls, the cylindrical tube is disposed within the pivot opening of both of the pair of sidewalls, and the reinforcement plate is connected to the outer surface of one of the pair of sidewalls, and the central portion is in circumscribing relationship with the cylindrical tube such that the cylindrical tube is disposed within the tube opening.

Further and alternative aspects and features of the disclosed principles will be appreciated from the following detailed description and the accompanying drawings. As will be appreciated, the principles related to linkage assemblies for an implement system disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 4 is a longitudinal cross-sectional view of the boom of FIG. 2.

FIG. 5 is a cross-sectional view of the boom of FIG. 2 taken along the line V-V in FIG. 4.

FIG. 6 is an enlarged, detail view taken from FIG. 4, as indicated by circle VI in FIG. 4.

FIG. 8 is a longitudinal cross-sectional view, in perspective, of the stick of FIG. 7.

FIG. 9 is a longitudinal cross-sectional view of the stick of FIG. 7, showing a stick joint reinforcement plate in broken lines for illustrative purposes.

FIG. 10 is a cross-sectional view of the stick of FIG. 7 taken along the line X-X in FIG. 9.

FIG. 13 is a flowchart illustrating steps of an embodiment of a method of making a stick for a linkage assembly of an implement system following principles of the present disclosure.

DETAILED DESCRIPTION

The present disclosure relates generally to a linkage assembly for a machine configured for use with an implement system. In embodiments, the present disclosure relates to a load-bearing member for a linkage assembly of an implement system, such as a boom and a lift arm or stick. The load-bearing member includes a body and a joint assembly.

In embodiments, the body includes a pair of sidewalls, a top portion, and a bottom portion. The sidewalls are in lateral spaced relationship to each other. The sidewalls each includes an inner surface in confronting relationship with each other and an outer surface in respective opposing relationship to the inner surface. Each sidewall defines therein a pivot opening. The top portion and the bottom portion extend between the sidewalls and are connected to the inner surface of each of the sidewalls by a welding operation. The sidewalls, the top portion, and the bottom portion define an interior cavity.

In embodiments, the body is substantially free of structural weldments disposed within the interior cavity of the body. In embodiments, the body is free of: a transverse structural member that both extends between the pair of sidewalls within the interior cavity of the body.

In embodiments, the joint assembly includes a stick joint tube and a reinforcement plate. The stick joint tube extends between and is connected to the sidewalls. The stick joint tube is disposed within the pivot opening of both of the sidewalls. The reinforcement plate is connected to the outer surface of one of the sidewalls. The reinforcement plate includes a central portion defining a tube opening. The central portion is in circumscribing relationship with the stick joint tube such that the stick joint tube is disposed within the tube opening. Both the stick joint tube and the reinforcement plate are connected to the body by a welding operation which produces weldments accessible from the outer surfaces of the sidewalls. The components of the joint assembly are fabricated without using a forging operation.

Examples of machines which can include a linkage assembly constructed in accordance with principles of the present disclosure include mobile or fixed machines used for construction, mining, forestry, and other similar industries. In some embodiments, the machine can be an excavator, loader, backhoe, material-handling machine, or any other machine suitable for use with a linkage assembly for operating an implement.

Figure 1:
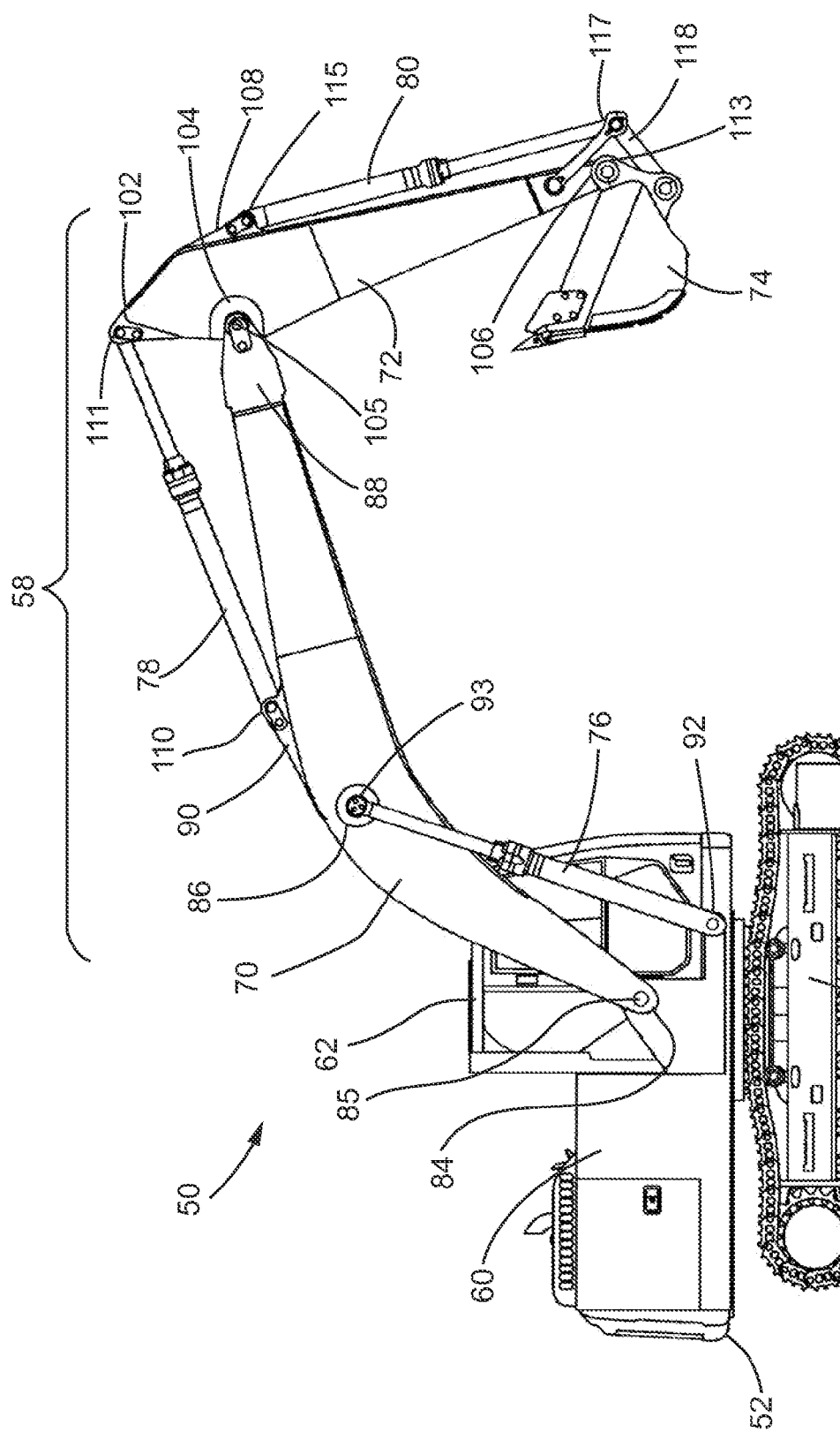
FIG. 1 is a diagrammatic side view of an embodiment of an excavator including an embodiment of a boom-stick linkage.

Turning now to the Figures, there is shown in FIG. 1 an exemplary embodiment of a machine 50 in the form of an excavator that includes a frame 52 pivotally mounted to a track-type undercarriage 54, and an implement system 58 pivotally mounted to the frame 52. The machine 50 may also be referenced herein as a track-type machine. In other embodiments, the machine 50 can be any suitable machine for use with a linkage assembly constructed in accordance with principles of the present disclosure, such as, a backhoe, crane, loader or any similar machine, for example.

The frame 52 includes a power system 60 configured to supply power to the machine 50 and an operator station 62 configured to selectively operate the machine 50. The undercarriage 54 is in operable arrangement with the power system 60 and the operator station 62 to selectively propel the machine 50. In embodiments, a drive system can be provided in the form of a track-drive system, a wheel-drive system, or any other type of drive system to propel the machine 50.

The power system 60, such as an engine, a cooling system, and/or a hydraulic system, for example, is located on the frame 52 and is adapted to provide operating power for the propulsion and operation of the implement system 58 as is understood by those having ordinary skill in the art. The power system 60 can comprise an engine such as, a diesel engine, a gasoline engine, a gaseous fuel-powered engine or any other type of engine. It is contemplated that the power system 60 can embody a non-combustion source of power in other embodiments, such as, a fuel cell, a power storage device, a battery or any other type of power source. The power system 60 can be configured to produce a mechanical or electrical power output that may then be converted to hydraulic power for operating the implement system 58.

The operator station 62 is configured to allow an operator access to controls for operating the machine 50. Further, the operator station 62 is located on the frame 52, which is rotatably coupled with the undercarriage 54 such that the operator station 62 can rotate in a clockwise or a counter-clockwise direction with respect to the undercarriage 54.

The implement system 58 is in operable arrangement with the power system 60 and the operator station 62 such that the implement system 58 is selectively movable by the operator station 62 using power supplied by the power system 60. The implement system 58 includes a boom 70 pivotally coupled to the frame 52, a stick 72 pivotally coupled to the boom 70, and an implement 74 pivotally coupled to the stick 72 by a series of pinned joints that permit the various load-bearing members to rotatably move with respect to at least one of the other members. The implement system 58 also includes a boom actuator 76, a stick actuator 78, and an implement actuator 80 that are in operable arrangement with the power system 60 and the operator station 62 to selectively move and articulate the implement 74. In embodiments, the actuators 76, 78, 80 can comprise hydraulic cylinders that are selectively actuated via a suitable hydraulic system.

The boom 70 includes a proximal boom pivot end 84, a boom actuator joint assembly 86, a distal boom nose 88, and a stick actuator pivot bracket 90. The boom 70 is pivotally connected to the frame 52 with a pinned joint 85 at the proximal boom pivot end 84. The boom actuator 76 is pivotally connected at a proximal end 92 thereof to the frame 52 and at a distal end 93 thereof to the boom actuator joint assembly 86 using pinned joints for example.

The stick 72 includes a proximal stick actuator pivot end 102, a stick joint 104, a distal implement pivot end 106, and an implement actuator pivot bracket 108. The stick 72 is pivotally mounted to the boom 70 at the stick joint 104 with a pinned joint 105 through the boom nose 88. The stick actuator 78 is pivotally connected at a proximal end 110 thereof to the stick actuator pivot bracket 90 of the boom 70 and at a distal end 111 thereof to the proximal stick actuator pivot end 102 of the stick 72 using pinned joints for example.

The implement 74 is pivotally connected to the stick 72 at the distal implement pivot end 106 with a pinned joint 113. The implement actuator 80 is pivotally connected at a proximal end 115 thereof to the implement actuator pivot bracket 108 of the stick 72 and at a distal end 117 thereof to the implement 74 using pinned joints for example.

The illustrated implement 74 is in the form of a bucket with a bucket linkage assembly 118. The bucket linkage assembly 118 is pivotally connected to the stick 72 and to the bucket 74. The distal end 117 of the implement actuator 80 is pivotally connected to the bucket linkage assembly 118.

In use, an operator can control the movement of the stick 72 using the operator station 62 to thereby move the bucket 74 to a location where the bucket 74 can be curled to scoop up material (e.g., dirt, rocks, sand, bricks, and/or other materials) (not shown), and then to move the bucket 74 to a location where the bucket 74 can be uncurled to empty the scooped material from the bucket 74. The operator can control the curling and uncurling of the bucket 74 by the movement of the implement actuator 80 in conjunction with the bucket linkage assembly 118.

The implement 74 may be used to engage the ground or other material in a digging action to move and/or remove earth or other material. Such digging action subjects the implement 74 to forces which can be transmitted to the stick 72 and the boom 70. Such forces may have a vector oriented laterally and/or offset to a longitudinal axis of the stick 72 and/or the boom 70, resulting in a torsional load being applied.

While the linkage assembly 70, 72 is illustrated in the context of a track-type machine, it should be appreciated that the present disclosure is not thereby limited, and that a wide variety of other machines having linkage assemblies are also contemplated within the present context. For example, in other embodiments, a linkage assembly constructed in accordance with the present disclosure can be included in a stationary arrangement, or in any other application known to those skilled in the art.

Referring now to FIGS. 2-6, a boom 170 constructed in accordance with principles of the present disclosure is shown. The boom 170 of FIG. 2 can be used in a linkage assembly of an implement system 58, such as shown in FIG. 1, for example. The illustrated boom 170 includes a boom body 182, a proximal boom pivot end 184, a boom actuator joint assembly 186, a distal boom nose 188, a first fork reinforcement plate 187, a second fork reinforcement plate 189, and a stick actuator pivot bracket 190.

Figure 2:
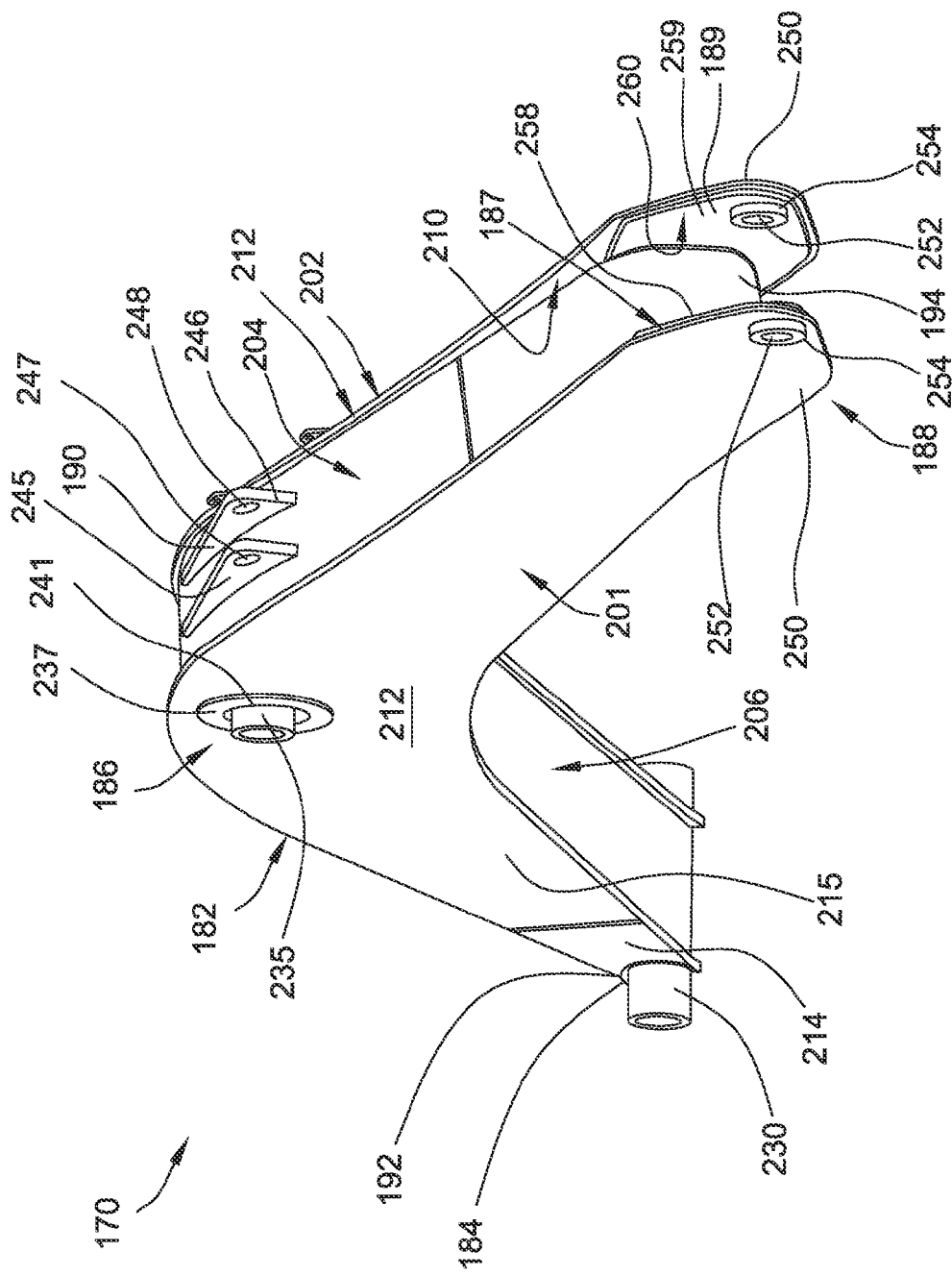
FIG. 2 is a perspective view of an embodiment of a boom for a linkage assembly of an implement system constructed in accordance with principles of the present disclosure.
Figure 3:
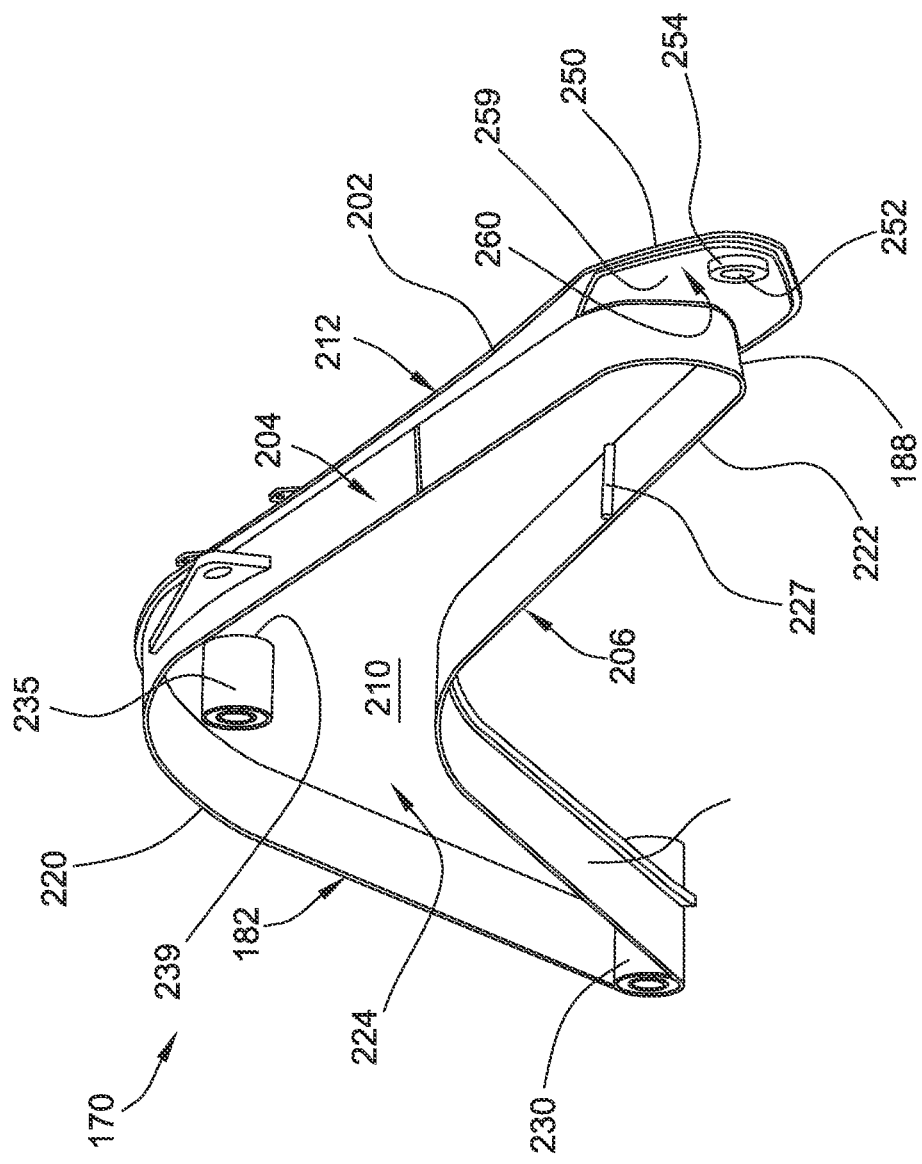
FIG. 3 is a longitudinal cross-sectional view, in perspective, of the boom of FIG. 2.

Referring to FIGS. 2 and 3, the boom body 182 has a proximal body end 192 and a distal body end 194. The boom body 170 includes a pair of sidewalls 201, 202, a top portion 204, and a bottom portion 206. The sidewalls 201, 202 are in lateral spaced relationship to each other. The sidewalls 201, 202 are substantially identical to each other. Each sidewall 201, 202 includes an inner surface 210, which are in confronting relationship with each other, and an outer surface 212 which face away from each other.

Referring to FIG. 2, each of the illustrated sidewalls 201, 202 can be made from a pair of sidewall plates 214, 215. In embodiments, a distal sidewall plate 214 can be thicker than the other sidewall plate 215 to add more mass to help diffuse the load stress generated at the proximal boom pivot end 184.

Referring to FIGS. 2 and 3, the top portion 204 and the bottom portion 206 extend between the pair of sidewalls 202. The top portion 204 and the bottom portion 206 can be connected to the inner surfaces 210 of the sidewalls 201. 202 by a welding operation, for example. The top portion 204 and the bottom portion 206 define the boom nose 188 at the distal body end 194 of the boom body 182. In the illustrated embodiment, the top portion 204 and the bottom portion 206 are made up of three separate plates that are formed with the appropriate bends: a top plate 220, a bottom plate 221, and a nose wrapper plate 222. The pair of sidewalls 201, 202, the top portion 204, the bottom portion 206, and the boom nose 188 form a box-beam-type structure which defines an interior cavity 224.

Referring to FIG. 3, the boom body 182 is substantially free of structural weldments disposed within the interior cavity 224 of the boom body 182. The boom body 182 is free of any transverse structural members that extend between the pair of sidewalls 201, 202 and/or have a structural weldment disposed within the interior cavity 224 of the boom body 182. The interior cavity 224 of the boom body 182 can include items such as a back-up strip 227 for a weld, as shown between the bottom plate 221 and the nose wrapper plate 222, and yet still be "substantially free of structural weldments."

Referring to FIGS. 2 and 3, the proximal boom pivot end 184 includes a frame pivot tube 230 that is welded to the sidewalls 201, 202 and to the top plate 220 and the bottom plate 221. The frame pivot tube 230 can be made without using a forging operation. In embodiments, the frame pivot tube 230 can be machined from a blank to define its cylindrical shape. The interior of the frame pivot tube 230 can be machined so that the tube can accept a pair of pin bearings (not shown) therein which are configured to rotatably support the pin used to pivotally connect the boom 170 to the frame 52 of the machine 50. The pin bearings can be mounted to the frame pivot tube 230 using any suitable technique known to those skilled in the art, such as, by press-fitting, for example. In embodiments, the frame pivot tube 230 can be adjustably sized so that the boom 170 is suitable for use as a retrofit component in a legacy system.

Referring to FIGS. 2 and 3, the boom actuator joint assembly 186 includes a boom actuator pivot tube 235 and a pair of reinforcement plates 237 (one shown). The boom actuator pivot tube 235 extends through a boom lift opening 239 defined in each sidewall 202 (FIG. 3). Each reinforcement plate 237 defines a tube opening 241. The reinforcement plates 237 are respectively connected to the sidewalls 201, 202 such that each reinforcement plate 237 is in circumscribing relationship with the boom actuator pivot tube 235 which extends through the tube opening 241 in the respective reinforcement plate 237. In embodiments, the area between the reinforcement plate 237 and the boom actuator pivot tube 235 can be filled with a groove weld from the outer surface 212 of each sidewall 201, 202 and finished with a fillet weld such that the boom actuator joint assembly 186 is connected to the boom body 182 without using any weldments disposed within the interior cavity 224 of the boom body 182.

The boom actuator pivot tube 235 and the reinforcement plates 237 can be fabricated without using a forging operation. In embodiments, the boom actuator pivot tube 235 can be machined in a manner similar to the frame pivot tube 230 and be equipped with pin bearings using any suitable technique known in the art.

The stick actuator pivot bracket 190 is connected to the top portion 204 of the boom body 182. The stick actuator pivot bracket 190 can include any suitable structure for use in pivotally connecting the proximal end 110 of the stick actuator 78 to the boom body 182.

Referring to FIG. 2, the illustrated stick actuator pivot bracket 190 includes a pair of elongated ears 245, 246 in lateral spaced relationship to each other. The ears 245, 246 can include a respective pin aperture 247, 248 sized to accommodate a pin joint for pivotally connecting the proximal end 110 of the stick actuator 78 thereto.

Referring to FIGS. 2-4, each sidewall 201, 202 includes a fork portion 250 disposed at the distal body end 194 and extending in outward relationship to the boom nose 188. Each fork portion 250 defines therein a stick mounting opening 252. Each fork portion 250 can include one or more spacers 254 configured to help adjust the spacing both between the fork portions 250 and outboard of the fork portions 250 to help facilitate the use of the boom 170 as a retrofit component in a legacy system.

Each fork portion 250 of the sidewalls 201, 202 has a fork reinforcement plate 258, 259 connected to an inboard side 260 of the fork portion 250. The fork reinforcement plates 258, 259 are substantially identical. Accordingly, it will be understood that the description of one fork reinforcement plate is applicable to the other, as well.

Each fork reinforcement plate 258, 259 is connected to the inner surface 210 of a respective one of the pair of sidewalls 201, 202 at the fork portion 250. Each fork reinforcement plate 258, 259 includes a proximal plate end 270 and a distal plate end 272. The proximal plate ends 270 of both the first and second fork reinforcement plates 258, 259 are in abutting relationship with the boom nose 188.

Referring to FIG. 6, the fork reinforcement plate 259 defines a pin opening 274. The pin opening 274 is in aligned relationship with the stick mounting opening 252 of the sidewall 202 to which the fork reinforcement plate 259 is connected to allow a pin to extend therethrough.

The fork reinforcement plate 259 includes a perimeter 276 having a pair of tip segments 280, 281, a pair of tail segments 283, 284, and a proximal segment 287. The pair of tip segments 280, 281 converges together at the distal plate end 272 to define a tip 289. The tip 289 has a convex curved outer edge. The pair of tip segments 280, 281 of the fork reinforcement plate 259 defines a tip angle $\Phi$ therebetween. In embodiments, the tip angle $\Phi$ is in a range between 40° and 60°. In yet other embodiments, the tip angle $\Phi$ is in a range between 45° and 55°. The illustrated tip angle $\Phi$ is about 50°.

The pair of tail segments 283, 284 respectively adjoins the pair of tip segments 280, 281 and converges toward each other moving from the pair of tip segments 280, 281 toward the proximal plate end 270 of the fork reinforcement plate 259. In embodiments, the pair of tail segments 283, 284 can be configured to converge so that the stress concentrations to which the nose wrapper plate 222 is subjected under load is reduced relative to a fork reinforcement plate which has a tail portion without converging tail segments. The generally "arrowhead" shape of the fork reinforcement plate 259 with the converging tip segments 280, 281 and tail segments 283, 284 helps reduce stress concentrations as compared to a rectangular shape, for example.

The pair of tail segments 283, 284 of the fork reinforcement plate 259 defines a tail angle $\gamma$ therebetween. In embodiments, the tip angle $\Phi$ is greater than the tail angle $\gamma$. In embodiments, the tail angle $\gamma$ is in a range between 10° and 30°. In yet other embodiments, the tail angle $\gamma$ is in a range between 15° and 25°. The illustrated tail angle $\gamma$ is about 18°.

The proximal segment 287 is disposed between the pair of tail segments 283, 284 at the proximal plate end 270 of the fork reinforcement plate 259. The proximal segment 287 is concave. The proximal segment 287 is in abutting relationship to a portion of the boom nose 188 and has a complementary shape thereto.

Referring to FIG. 5, the pair of sidewalls 201, 202 each includes a top edge 292 and a bottom edge 294. The top portion 204 is connected to the inner surface 210 of each of the sidewalls 201, 202 such that the top portion 204 is in adjacent, offset relationship to the top edge 292 of each of the sidewalls 201, 202. The bottom portion 206 is connected to the inner surface 210 of each of the sidewalls 201, 202 such that the bottom portion 206 is in adjacent, offset relationship to the bottom edge of each of the sidewalls 201, 202 to thereby form a modified H-shaped cross section which has two cross pieces (i.e., the top portion 204 and the bottom portion 206).

The external, inboard fork reinforcement plates 258, 259 are butted up against the nose wrapper plate 222. All welds connecting the fork reinforcement plates 258, 259 are outside of the interior cavity 224 of the boom body 182 and are readily accessible for inspection and repair. The use of the fork reinforcement plates 258, 259 allows for acceptable levels of load stress distributions without the use of internal welds or baffle plates within the interior cavity 224 of the boom body 182.

Referring now to FIGS. 7-10, a stick 372 constructed in accordance with principles of the present disclosure is shown. The stick 372 of FIG. 7 can be used in a linkage assembly of an implement system 58, such as shown in FIG. 1, for example. The stick 372 of FIG. 7 can be pivotally coupled to the boom 170 of FIG. 2 at the fork end such that the stick 372 is disposed inward of and between the first and second fork reinforcement plates 258, 259. The illustrated stick 372 includes a stick body 395, a proximal stick actuator pivot end 402, a stick joint assembly 404, a distal implement pivot end 406, an idler linkage pivot 407, and an implement actuator pivot bracket 408.

The stick body 395 includes a pair of sidewalls 410, 411, a top portion 414, and a bottom portion 417. The pair of sidewalls 410, 411 is in lateral spaced relationship to each other. The sidewalls 410, 411 are substantially identical to each other.

Figure 7:
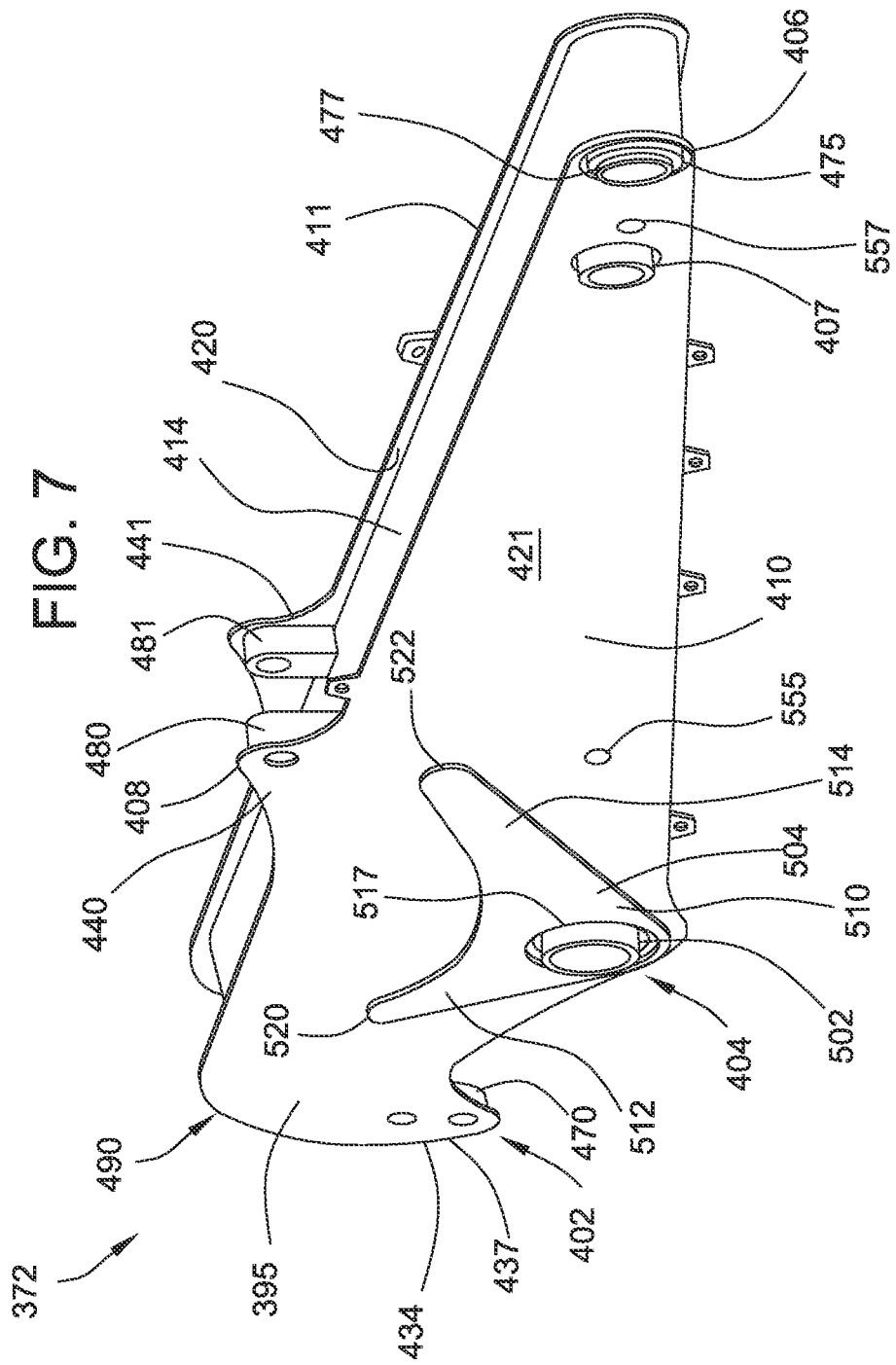
FIG. 7 is a perspective view of an embodiment of a stick for a linkage assembly of an implement system constructed in accordance with principles of the present disclosure.

Referring to FIGS. 7 and 8, the sidewalls 410, 411 each include an inner surface 420, which are in confronting relationship with each other, and an outer surface 421, which face away from each other. Each of the illustrated sidewalls 410, 411 is made from a single, unitary sidewall plate.

Referring to FIG. 8, each of the sidewalls 410, 411 defines therein a stick pivot opening 425, an implement pivot opening 427, and an idler linkage pivot opening 429. Referring to FIGS. 7 and 8, each of the sidewalls 410, 411 includes a proximal horn portion 434 that defines a mounting ear 437 of the proximal stick actuator pivot end 402. Each of the sidewalls 410, 411 includes a projecting mounting ear 440, 441 extending from a top edge 444 that is a part of the implement actuator pivot bracket 408.

The top portion 414 and the bottom portion 417 both extend between the pair of sidewalls 410, 411. The top portion 414 and the bottom portion 417 can be connected to the inner surfaces 420 of the sidewalls 410, 411 by a welding operation, for example (see FIG. 10 also). The pair of sidewalls 410, 411, the top portion 414, and the bottom portion 417 form a box-beam-type structure which defines an interior cavity 450.

Referring to FIG. 8, the top portion 414 and the bottom portion 417 can be connected to an implement pivot tube 455 of the distal implement pivot end 406 using external welds, which can be inspected from the exterior of the stick body 395. The top portion can be connected to the bottom portion at an end 457 adjacent the proximal stick actuator pivot end via an external weld.

The top portion 414 and the bottom portion 417 are connected to the pair of sidewalls 410, 411 by any suitable welding operation. The stick 372 is substantially free of structural weldments disposed within the interior cavity 450 of the stick body 395. The stick body 395 is free of any transverse structural members that extend between the pair of sidewalls 410, 411 and does not have a structural weldment disposed within the interior cavity 450 of the stick body 395.

Referring to FIGS. 7 and 8, the proximal stick actuator pivot end 402 includes each proximal horn portion 434 of the sidewalls 410, 411 and a pair of bearing blocks 470, 471 respectively welded to the inner surface 420 of the sidewalls 410, 411 and disposed outside of the interior cavity 450. The bearing blocks 470, 471 are configured to receive therethrough a suitable pin for pivotally connecting the distal end 111 of the stick actuator 78 to the stick 372 of FIG. 7. In the illustrated embodiment, the bearing blocks 470, 471 include multiple openings 474 to help allow the stick 372 to be used as a retrofit component for different legacy systems.

The distal implement pivot end 406 includes the implement pivot tube 455 and a pair of reinforcement plates 475 (one shown in FIG. 7). The implement pivot tube 455 extends through the implement pivot opening 427 of each sidewall 410, 411 and is connected to the pair of sidewalls 410, 411. The reinforcement plates 475 are respectively connected to the sidewalls 410, 411 such that each reinforcement plate 475 is in circumscribing relationship with the implement pivot tube 455 which extends through a tube opening 477 in the respective reinforcement plate 475. In embodiments, the area between each reinforcement plate 475 and the implement pivot tube 455 can be filled with a groove weld from the outer surface 421 of each sidewall 410, 411 and finished with a fillet weld such that the distal implement pivot end 406 is connected to the stick body 395 without using any weldments disposed within the interior cavity 450 of the stick body 395. In embodiments, the idler linkage pivot 407 can have a construction similar to that of the distal implement pivot end 406.

Referring to FIGS. 7 and 8, the stick body 395 includes a pair of implement actuator bearing blocks 480, 481. The implement actuator bearing blocks 480, 481 are respectively disposed in abutting relationship to the inner surface 420 of the sidewalls 410, 411 and is aligned with the implement actuator pivot bracket 408. The pair of implement actuator bearing blocks 480, 481 is configured to transmit to the pair of sidewalls 410, 411, respectively, a load generated by a pin that pivotally couples the implement actuator 80 to the implement actuator pivot bracket 408. Thus, the implement actuator bearing blocks 480, 481 help transmit the loads generated by the implement actuator 80 into the sidewalls 410, 411 and away from the top portion 414 of the stick 372.

Referring to FIGS. 7 and 9, the stick body 395 includes a convex extended portion 490 disposed between the proximal stick actuator pivot end 402 and the implement actuator pivot bracket 408. The convex extended portion 490 is configured to decrease stress concentrations generated in the stick body 395 at the proximal stick actuator pivot end 402 and at the implement actuator pivot bracket 408 relative to a similar body but without the convex extended portion. The convex extended portion 490 can be configured to place support material along a load path created by the interaction of the stick actuator 78 and the implement actuator 80 which are pivotally coupled to the stick 372.

Referring to FIGS. 7 and 9, the stick joint assembly 404 can be used to pivotally couple the stick 372 of FIG. 7 to the boom 170 of FIG. 2. The stick joint assembly 404 includes a stick joint tube 502, a first stick joint reinforcement plate 504, and a second stick joint reinforcement plate 505. The first and second stick joint reinforcement plates 504, 505 are respectively connected to the sidewalls 410, 411. The first and second stick reinforcement plates 504, 505 are substantially identical to each other. Accordingly, it should be understood that the description of one stick reinforcement plate is applicable to the other, as well.

The stick joint tube 502 extends between and is connected to the pair of sidewalls 410, 411. The stick joint tube 502 is disposed within the stick pivot opening 425 of both of the pair of sidewalls 410, 411.

Each stick joint reinforcement plate 504, 505 is connected to one of the sidewalls 410, 411. Each stick joint reinforcement plate 504, 505 includes a central portion 510, a first arm 512, and a second arm 514. The central portion 510 defines a tube opening 517. The central portion 510 is in circumscribing relationship with the stick joint tube 502 such that the stick joint tube 502 is disposed within the tube opening 517. The first arm 512 extends from the central portion 510 and has a first end 520. The second arm 514 extends from the central portion 510 and has a second end 522.

Referring to FIG. 9, the first end 520 and the second end 522 of the stick joint reinforcement plate 505 can be configured to help decrease the generation of load stress areas along its welded edges. In the illustrated embodiment, the first end 520 and the second end 522 of the stick joint reinforcement plate 505 extend to a termination point such that they are disposed along a neutral axis NA defined by the stick body 395 (see FIG. 9).

Referring to FIG. 9, the first arm 512 of the stick joint reinforcement plate 505 extends along a first arm axis 525, and the second arm 514 of the stick joint reinforcement plate 505 extends along a second arm axis 530. The first arm axis 525 and the second arm axis 530 defining an arm angle $\theta$ therebetween. The arm angle $\theta$ can be in a range between 45° and 135°. In other embodiments, the arm angle is in a range between 65° and 115°. In the illustrated embodiment, the first arm axis 525 and the second arm axis 530 are substantially perpendicular to each other.

The first end 520 and the second end 522 of the stick joint reinforcement plate 505 each includes a convex distal perimeter segment 535. The convex distal perimeter segment 535 of the first end 520 and the second end 522 has a first radius of convex curvature and a second radius of convex curvature, respectively. The first radius of convex curvature and the second radius of convex curvature are substantially the same.

The illustrated stick reinforcement plate 505 is configured to add reinforcement to high stress areas without imparting significant/unacceptable stress along its welded edges. The stick joint reinforcement plate 505 includes an outer perimeter 540 that generally defines a "boomerang" shape. The outer perimeter 540 of the stick reinforcement plate 505 can be welded to the outer surface 421 of the sidewall 411 without using a structural weld disposed within the interior cavity 450 of the stick body 395. The outer perimeter 540 includes a concave segment 542, a first arm segment 544, a second arm segment 546, and the convex distal perimeter segments 535 of the first end 520 and the second end 522. The concave segment 542 extends between the convex distal perimeter segment 535 of the first end 520 and the second end 522. The first arm segment 544 and the second arm segment 546 are generally linear. The convex distal perimeter segment 535 of the first end 520 is disposed between the first arm segment 544 and the concave segment 542. The convex distal perimeter segment 535 of the second end 522 is disposed between the second arm segment 546 and the concave segment 542.

Referring to FIGS. 7 and 8, a pair of lube passages 550, 552 can be provided for providing lubricant to the interior of the stick joint tube 502 and the implement pivot tube 455, respectively. Each lube passage 550, 552 can include a respective lube port 555, 557 in fluid communication with the lube passage and open to the outer surface 421 of one of the sidewalls 410 (FIG. 7).

Referring to FIG. 10, the pair of sidewalls 410, 411 each includes the top edge 444 and a bottom edge 570. The top portion 414 is connected to the inner surface 420 of each of the pair of sidewalls 410, 411 such that the top portion 414 is in adjacent, offset relationship to the top edge 444 of each of the pair of sidewalls 410, 411. The bottom portion 417 is connected to the inner surface 420 of each of the pair of sidewalls 410, 411 such that the bottom portion 417 is in adjacent, offset relationship to the bottom edge 570.

Figure 11:
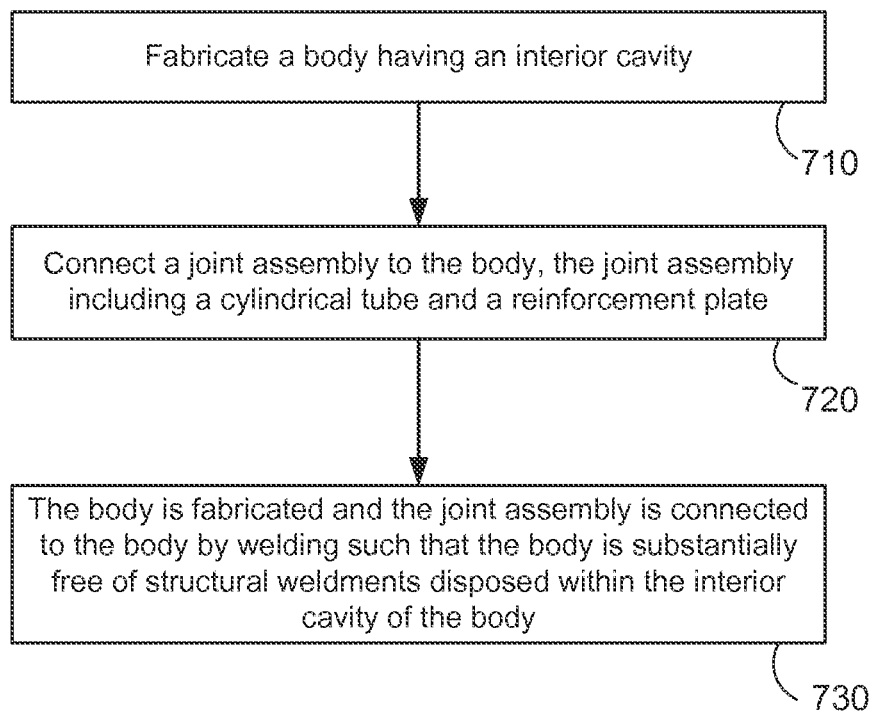
FIG. 11 is a flowchart illustrating steps of an embodiment of a method of making a load-bearing member for a linkage assembly of an implement system following principles of the present disclosure.

Referring to FIG. 11, in another aspect of the disclosure, an embodiment of a method 700 of making a load-bearing member for a linkage assembly of an implement system includes fabricating a body having an interior cavity (step 710) and connecting a joint assembly to the body (step 720). The joint assembly includes a cylindrical tube and a reinforcement plate. The body includes a pair of sidewalls, a top portion, and a bottom portion. The pair of sidewalls each includes an inner surface and an outer surface in respective opposing relationship to the inner surface. The body is fabricated such that: the pair of sidewalls are in lateral spaced relationship to each other, each inner surface of the pair of sidewalls is in confronting relationship with the other inner surface, the top portion extends between the pair of sidewalls and is connected to the inner surface of each of the pair of sidewalls, the bottom portion extends between the pair of sidewalls and is connected to the inner surface of each of the pair of sidewalls, the pair of sidewalls, the top portion, the bottom portion define an interior cavity, and each of the pair of sidewalls define therein a pivot opening.

The body is fabricated and the joint assembly is connected to the body by welding such that the body is substantially free of structural weldments disposed within the interior cavity of the body (step 730). In embodiments, the body is fabricated such that the interior cavity is free of a transverse structural member that extends between the pair of sidewalls and is not housing a portion of a pivot joint (e.g., a pin). In embodiments, the body is fabricated such that the interior cavity is free of a structural member that has a structural weldment disposed within the interior cavity of the body. In embodiments, the body is fabricated such that the interior cavity is free of: a transverse structural member that both extends between the pair of sidewalls and has a structural weldment disposed within the interior cavity of the body.

In embodiments, the pair of sidewalls each includes a top edge and a bottom edge. The body is fabricated such that the top portion is connected to the inner surface of each of the pair of sidewalls such that the top portion is in adjacent, offset relationship to the top edge of each of the pair of sidewalls. The bottom portion is connected to the inner surface of each of the pair of sidewalls such that the bottom portion is in adjacent, offset relationship to the bottom edge.

The joint assembly includes a stick joint tube and a reinforcement plate. The reinforcement plate includes a central portion defining a tube opening. The joint assembly is connected to the body such that: the stick joint tube extends between and is connected to the pair of sidewalls, the stick joint tube is disposed within the pivot opening of both of the pair of sidewalls, and the reinforcement plate is connected to the outer surface of one of the pair of sidewalls, and the central portion is in circumscribing relationship with the stick joint tube such that the stick joint tube is disposed within the tube opening.

In embodiments, the method includes fabricating the joint assembly such that the joint assembly is fabricated without using a forging operation. In embodiments, the stick joint tube of the joint assembly is fabricated by machining a steel blank.

Figure 12:
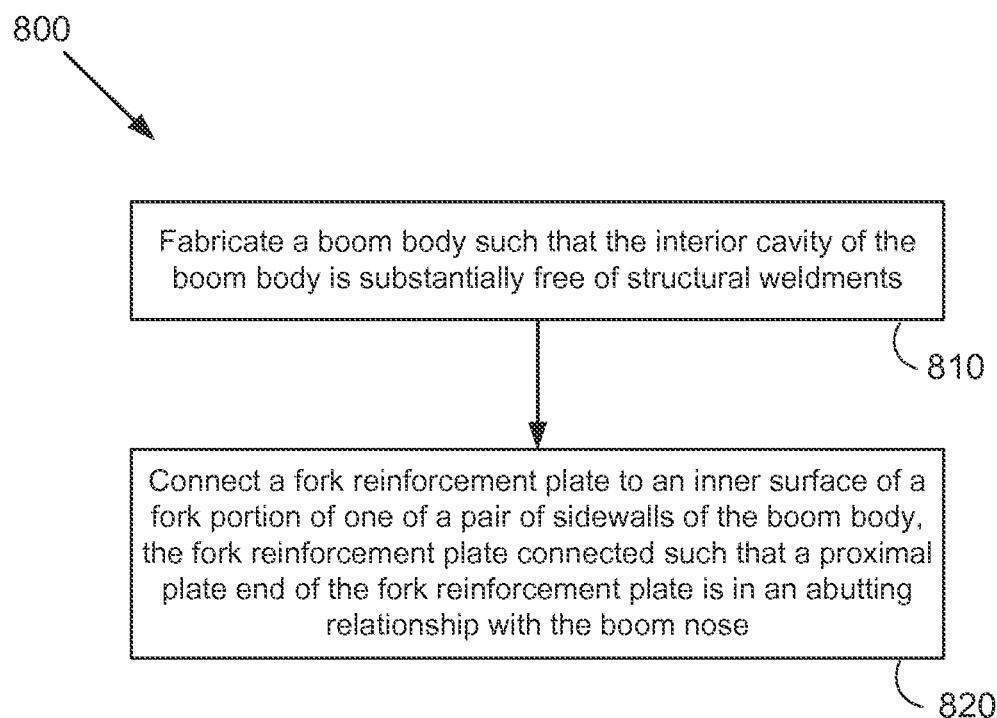
FIG. 12 is a flowchart illustrating steps of an embodiment of a method of making a boom for a linkage assembly of an implement system following principles of the present disclosure.

Referring to FIG. 12, in still another embodiment, a method 800 of making a boom for a linkage assembly of an implement system includes fabricating a boom body (step 810) and connecting a fork reinforcement plate to the inner surface of one of the pair of sidewalls of the boom body at a fork portion (step 820). The boom body has a proximal body end and a distal body end. The boom body includes a pair of sidewalls, a top portion, and a bottom portion. The pair of sidewalls is in lateral spaced relationship to each other. The pair of sidewalls each includes an inner surface in confronting relationship with each other. The top portion and the bottom portion extend between the pair of sidewalls. The top portion and the bottom portion define a boom nose at the distal body end of the boom body. The pair of sidewalls, the top portion, the bottom portion, and the boom nose define an interior cavity. The pair of sidewalls each includes a fork portion disposed at the distal body end and extending in outward relationship to the boom nose. Each fork portion defines therein a stick mounting opening.

In embodiments, the boom body is fabricated by welding the pair of sidewalls to the top portion and to the bottom portion such that the interior cavity of the boom body is substantially free of structural weldments (step 810). In embodiments, the boom body is fabricated such that the interior cavity is free of a transverse structural member that extends between the pair of sidewalls and is not housing a portion of a pivot joint (e.g., a pin). In embodiments, the boom body is fabricated such that the interior cavity is free of a structural member that has a structural weldment disposed within the interior cavity of the boom body. In embodiments, the boom body is fabricated such that the interior cavity is free of: a transverse structural member that both extends between the pair of sidewalls and has a structural weldment disposed within the interior cavity of the boom body.

The fork reinforcement plate includes a proximal plate end and a distal plate end. The fork reinforcement plate is connected such that the proximal plate end of the fork reinforcement plate is in abutting relationship with the boom nose (step 820).

In embodiments, the fork reinforcement plate includes a perimeter having a pair of tip segments. The pair of tip segments converge together at the distal plate end to define a tip disposed at the distal plate end of the fork reinforcement plate. The perimeter of the fork reinforcement plate includes a pair of tail segments. The pair of tail segments respectively adjoin the pair of tip segments and converge toward each other, moving from the pair of tip segments toward the proximal plate end of the fork reinforcement plate.

In embodiments, a second fork reinforcement plate is connected to the inner surface of the other of the pair of sidewalls at the fork portion. The second fork reinforcement plate includes a proximal plate end and a distal plate end. The second fork reinforcement plate is connected such that the proximal plate end of the second fork reinforcement plate is in abutting relationship with the boom nose.

Referring to FIG. 13, in still another embodiment, a method 900 of making a stick for a linkage assembly of an implement system includes fabricating a stick body (step 910) and connecting a stick joint assembly to the stick body (step 930).

The stick body includes a pair of sidewalls, a top portion, and a bottom portion. The pair of sidewalls is in lateral spaced relationship to each other. The top portion and the bottom portion both extend between the pair of sidewalls. The pair of sidewalls, the top portion, and the bottom portion define an interior cavity. Each of the pair of sidewalls defines therein a stick pivot opening. The stick body defines a neutral axis.

In embodiments, the stick body is fabricated by welding the pair of sidewalls to the top portion and to the bottom portion such that the interior cavity of the stick body is substantially free of structural weldments. In embodiments, the stick body is fabricated such that the interior cavity is free of a transverse structural member that extends between the pair of sidewalls and is not housing a portion of a pivot joint (e.g., a pin). In embodiments, the stick body is fabricated such that the interior cavity is free of a structural member that has a structural weldment disposed within the interior cavity of the stick body. In embodiments, the stick body is fabricated such that the interior cavity is free of: a transverse structural member that both extends between the pair of sidewalls and has a structural weldment disposed within the interior cavity of the stick body.

The stick joint assembly includes a stick joint tube and a stick joint reinforcement plate. The stick joint tube extends between and is connected to the pair of sidewalls. The stick joint tube is disposed within the stick pivot opening of both of the pair of sidewalls. The stick joint reinforcement plate is connected to one of the pair of sidewalls. The stick joint reinforcement plate includes a central portion, a first arm, and a second arm. The central portion defines a tube opening. The central portion is in circumscribing relationship with the stick joint tube such that the stick joint tube is disposed within the tube opening. The first arm extends from the central portion and has a first end, and the second arm extends from the central portion and has a second end. The first end and the second end of the stick joint reinforcement plate are disposed along the neutral axis of the stick body.

In embodiments, the stick joint assembly is fabricated such that the stick joint assembly is fabricated without using a forging operation (step 920). In embodiments, the stick joint reinforcement plate is fabricated such that the first arm of the stick joint reinforcement plate extends along a first arm axis, and the second arm of the stick joint reinforcement plate extends along a second arm axis, the first arm axis and the second arm axis defining an arm angle therebetween, the arm angle being in a range between 45° and 135°.

INDUSTRIAL APPLICABILITY

The industrial applicability of the embodiments of a load-bearing member and a linkage assembly for an implement system described herein will be readily appreciated from the foregoing discussion. At least one embodiment of load-bearing member may be used for a linkage assembly. At least one embodiment of the disclosed linkage assemblies can be used in an implement system of a machine.

Embodiments of a load-bearing member and a linkage assembly according to principles of the present disclosure may find potential application in any machine, such as a track-type machine, which utilizes a track-type undercarriage. Such machines may include, but are not limited to, dozers, loaders, excavators, or any other on-highway or off-highway vehicles or stationary machines that utilize a track assembly, as described herein.

The disclosed techniques may be applicable to reinforce any box-beam type load bearing structure against torsional loads. Embodiments of a load-bearing member constructed in accordance with the present disclosure may provide torsional rigidity against a load without the need for internal baffle plates and associated structural welding within the interior cavity of the box-beam structure. The disclosed assembly techniques allow access to weld points from outside of the load bearing structure, facilitating manufacture, inspection, and repair of the load bearing structure without the need to access internal regions of the structure. Furthermore, acceptable load-carrying capability can be achieved using components made from processes which do not require specialized skilled labor or tooling and without resorting to more expensive processing techniques, such as forging.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A load-bearing member for a linkage assembly of an implement system, the load-bearing member comprising:
    a body, the body including a pair of sidewalls, a top portion, and a bottom portion, the pair of sidewalls in lateral spaced relationship to each other, the pair of sidewalls each including an inner surface in confronting relationship with each other and an outer surface in respective opposing relationship to the inner surface, the top portion extending between the pair of sidewalls and connected to the inner surface of each of the pair of sidewalls, the bottom portion extending between the pair of sidewalls and connected to the inner surface of each of the pair of sidewalls, the pair of sidewalls, the top portion, and the bottom portion defining an interior cavity, and each of the pair of sidewalls defining therein a pivot opening; and
    a joint assembly, the joint assembly including a cylindrical tube and a reinforcement plate, the cylindrical tube extending between and connected to the pair of sidewalls, the cylindrical tube disposed within the pivot opening of both of the pair of sidewalls, and the reinforcement plate connected to the outer surface of one of the pair of sidewalls, the reinforcement plate including a central portion defining a tube opening, the central portion in circumscribing relationship with the cylindrical tube such that the cylindrical tube is disposed within the tube opening;
    wherein the pair of sidewalls of the body each includes a top edge and a bottom edge, the top portion connected to the inner surface of each of the pair of sidewalls such that the top portion is in adjacent, offset relationship to the top edge of each of the pair of sidewalls, and the bottom portion connected to the inner surface of each of the pair of sidewalls such that the bottom portion is in adjacent, offset relationship to the bottom edge of each of the pair of sidewalls, and wherein the body is substantially free of structural weldments disposed within the interior cavity of the body.

2. The load-bearing member for a linkage assembly according to claim 1, wherein the body is free of: a transverse structural member that both extends between the pair of sidewalls and has a structural weldment disposed within the interior cavity of the body.

3. The load-bearing member for a linkage assembly according to claim 1, wherein the load-bearing member comprises a boom, the body having a proximal body end and a distal body end, the top portion and the bottom portion defining a boom nose at the distal body end, the pair of sidewalls each including a distal fork portion extending in outward relationship to the boom nose, the distal fork portion of each of the pair of sidewalls defining therein a stick mounting opening.

4. The load-bearing member for a linkage assembly according to claim 3, further comprising:
    a frame pivot tube connected to the proximal body end of the body; and
    a stick actuator pivot bracket connected to the top portion of the body.

5. The load-bearing member for a linkage assembly according to claim 1, wherein the load-bearing member comprises a stick, the stick including a proximal stick actuator pivot end and an implement actuator pivot bracket.

6. The load-bearing member for a linkage assembly according to claim 5, wherein the stick includes a distal implement pivot end having an implement pivot tube connected to the pair of sidewalls.

7. The load-bearing member for a linkage assembly according to claim 5, wherein the body includes a convex extended portion disposed between the proximal stick actuator pivot end and the implement actuator pivot bracket, the convex extended portion configured to decrease stress concentrations generated in the body at the proximal stick actuator pivot end and at the implement actuator pivot bracket relative to a similar body but without the convex extended portion.

8. The load-bearing member for a linkage assembly according to claim 5, further comprising a pair of implement actuator bearing blocks, the pair of implement actuator bearing blocks respectively disposed in abutting relationship to the inner surface of each of the pair of sidewalls and aligned with the implement actuator pivot bracket, the pair of implement actuator bearing blocks configured to transmit a load generated by a pin coupling the implement actuator to the implement actuator pivot bracket to the pair of sidewalls, respectively.

9. A machine comprising:
- a frame, the frame including a power system configured to supply power to the machine and an operator station configured to selectively operate the machine; and
- an implement system pivotally connected to the frame, the implement system in operable arrangement with the power system and the operator station such that the implement system is selectively movable by the operator station from power supplied by the power system, the implement system including a boom pivotally coupled to the frame, a stick pivotally coupled to the boom, and an implement pivotally coupled to the stick;
- wherein at least one of the boom and the stick includes a body and a joint assembly:
  - the body including a pair of sidewalls, a top portion, and a bottom portion, the pair of sidewalls in lateral spaced relationship to each other, the pair of sidewalls each including an inner surface in confronting relationship with each other and an outer surface in respective opposing relationship to the inner surface, the top portion extending between the pair of sidewalls and connected to the inner surface of each of the pair of sidewalls, the bottom portion extending between the pair of sidewalls and connected to the inner surface of each of the pair of sidewalls, the pair of sidewalls, the top portion, and the bottom portion defining an interior cavity, and each of the pair of sidewalls defining therein a pivot opening, and
  - the joint assembly including a cylindrical tube and a reinforcement plate, the cylindrical tube extending between and connected to the pair of sidewalls, the cylindrical tube disposed within the pivot opening of both of the pair of sidewalls, and the reinforcement plate connected to the outer surface of one of the pair of sidewall, the reinforcement plate including a central portion defining a tube opening, the central portion in circumscribing relationship with the cylindrical tube such that the cylindrical tube is disposed within the tube opening,
  - wherein the pair of sidewalls of the body each includes a top edge and a bottom edge, the top portion connected to the inner surface of each of the pair of sidewalls such that the top portion is in adjacent, offset relationship to the top edge of each of the pair of sidewalls, and the bottom portion connected to the inner surface of each of the pair of sidewalls such that the bottom portion is in adjacent, offset relationship to the bottom edge of each of the pair of sidewalls, and wherein the body is substantially free of structural weldments disposed within the interior cavity of the body.

10. The machine according to claim 9, wherein the body is free of: a transverse structural member that both extends between the pair of sidewalls and has a structural weldment disposed within the interior cavity of the body.

11. The machine of claim 9, further comprising:
- an undercarriage, the frame pivotally connected to the undercarriage, the undercarriage in operable arrangement with the power system to selectively propel the machine.

12. The machine according to claim 9, wherein the boom includes a proximal boom pivot end, a stick actuator pivot bracket, and a boom actuator joint assembly, the boom pivotally connected to the frame at the proximal boom pivot end; the stick includes a proximal stick actuator pivot end and an implement actuator pivot bracket; and the implement system includes a boom actuator, a stick actuator, and an implement actuator, the boom actuator pivotally connected at a proximal end thereof to the frame and at a distal end thereof to the boom actuator joint assembly, the stick actuator pivotally connected at a proximal end thereof to the stick actuator pivot bracket of the boom and at a distal end thereof to the proximal stick actuator pivot end of the stick, and the implement actuator is pivotally connected at a proximal end thereof to the implement actuator pivot bracket of the stick and at a distal end thereof to the implement, the boom actuator, the stick actuator, and the implement actuator in operable arrangement with the power system and the operator station for selective movement thereof.

13. The machine of claim 12, wherein the implement comprises a bucket with a bucket linkage assembly pivotally connected to the stick, the distal end of the implement actuator being pivotally connected to the bucket linkage assembly.

14. A method of making a load-bearing member for a linkage assembly of an implement system, the method comprising:
- fabricating a body, the body including a pair of sidewalls, a top portion, and a bottom portion, the pair of sidewalls each including an inner surface, an outer surface in respective opposing relationship to the inner surface, a top edge, and a bottom edge, the body fabricated such that: the pair of sidewalls are in lateral spaced relationship to each other, each inner surface of the pair of sidewalls is in confronting relationship with the other inner surface, the top portion extends between the pair of sidewalls and is connected to the inner surface of each of the pair of sidewalls, the bottom portion extends between the pair of sidewalls and is connected to the inner surface of each of the pair of sidewalls, the top portion connected to the inner surface of each of the pair of sidewalls such that the top portion is in adjacent, offset relationship to the top edge of each of the pair of sidewalls, the bottom portion connected to the inner surface of each of the pair of sidewalls such that the bottom portion is in adjacent, offset relationship to the bottom edge of each of the pair of sidewalls, and the pair of sidewalls, the top portion, and the bottom portion define an interior cavity, and each of the pair of sidewalls define therein a pivot opening; and
- connecting a joint assembly to the body, the joint assembly including a cylindrical tube and a reinforcement plate, the reinforcement plate including a central portion defining a tube opening, the joint assembly connected to the body such that: the cylindrical tube extends between and is connected to the pair of sidewall, the cylindrical tube is disposed within the pivot opening of both of the pair of sidewalls, and the reinforcement plate is connected to the outer surface of one of the pair of sidewalls, and the central portion is in circumscribing relationship with the cylindrical tube such that the cylindrical tube is disposed within the tube opening;
- wherein the body is fabricated and the joint assembly is connected to the body by welding such that the body is substantially free of structural weldments disposed within the interior cavity of the body.

15. The method according to claim 14, wherein the body is fabricated such that the interior cavity is free of: a transverse structural member that both extends between the pair of sidewalls and has a structural weldment disposed within the interior cavity of the body.

16. The method according to claim 14, further comprising:
    fabricating the joint assembly such that the joint assembly is fabricated without using a forging operation.

17. The method according to claim 16, wherein the cylindrical tube of the joint assembly is fabricated by machining a steel blank.

* * * * *